United States Patent

[11] 3,588,577

| [72] | Inventors | Charles I. McVey<br>Shaker Heights;<br>William C. Louden, South Euclid, Ohio |
|---|---|---|
| [21] | Appl. No. | 807,873 |
| [22] | Filed | Mar. 17, 1969 |
| [45] | Patented | June 28, 1971 |
| [73] | Assignee | General Electric Company |

[54] CALCIA ALUMINA MAGNESIA BARIA SEAL COMPOSITION
6 Claims, 1 Drawing Fig.

[52] U.S. Cl. .................................................. 313/317,
313/218, 106/214, 313/221
[51] Int. Cl. ...................................................... H01j 5/00
[50] Field of Search .......................................... 313/317,
218, 221, 318, 315; 65/59; 106/214

[56] References Cited
UNITED STATES PATENTS

| 3,065,291 | 11/1962 | Rexer | 313/318X |
|---|---|---|---|
| 3,281,309 | 10/1966 | Ross | 313/318X |
| 3,363,134 | 1/1968 | Johnson | 313/317X |
| 3,385,463 | 5/1968 | Lange | 313/317X |

*Primary Examiner*—John W. Huckert
*Assistant Examiner*—Andrew J. James
*Attorneys*—Ernest W. Legree, Henry P. Truesdell, Frank L. Neuhauser, Oscar B. Waddell and Melvin M. Goldenberg ABSTRACT: An improved seal or bond between a refractory metal and a translucent alumina ceramic body uses a glassy sealing composition centered on 36.4 weight percent CaO, 45.0 weight percent $Al_2O_3$, 4.7 weight percent MgO, and 13.9 weight percent BaO. This composition permits a lower sealing temperature (1410° C.), and a wider range (± 50° C.) in sealing temperature without deleterious effects, than previously known compositions.

PATENTED JUN28 1971 3,588,577
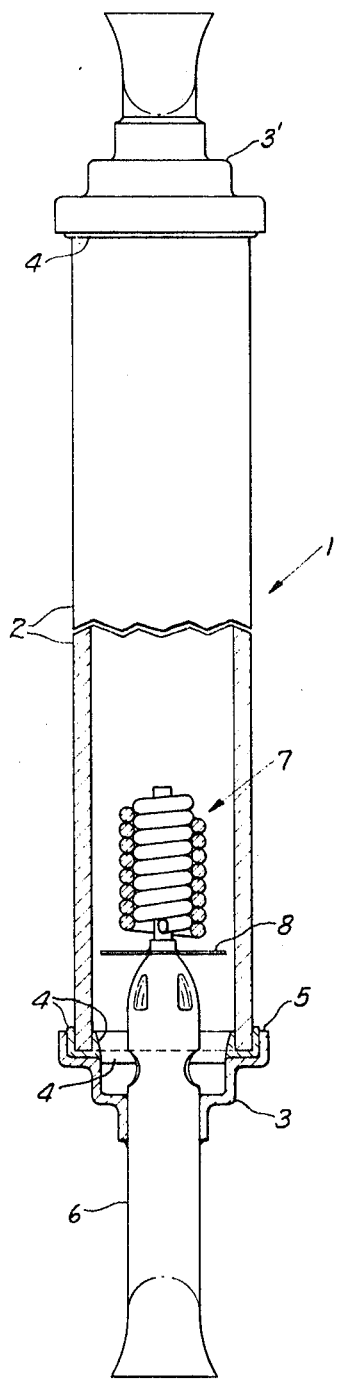
Inventors:
Charles I. McVey
William C. Louden
by Ernest W. Legree
Their Attorney 3,588,577

CALCIA ALUMINA MAGNESIA BARIA SEAL COMPOSITION

CROSS-REFERENCES TO COPENDING APPLICATIONS

Copending application Ser. No. 588,955, filed Oct. 24, 1966 by James F. Sarver and William C. Louden, entitled "Calcia Magnesia Alumina Seal Compositions" and similarly assigned, now U.S. Pat. No. 3,441,421, issued Apr. 29, 1969.

Copending application Ser. No. 590,568, filed Oct. 31, 1966, by William C. Louden, entitled "Niobium End Seal" and similarly assigned, now U.S. Pat No. 3,448,319, issued June 3, 1969.

Copending application Ser. No. 825,086 filed Nov. 18, 1968 by Paul J. Jorgensen, entitled "Ceramic-Metal Bonding Composition and Composite Article of Manufacture" and similarly assigned.

BACKGROUND OF THE INVENTION

This invention relates to glassy sealing compositions of particular value in bonding to alumina ceramic, that is, in bonding ceramic to ceramic or metal to ceramic, particularly niobium metal.

High density polycrystalline translucent alumina ceramic is particularly suitable as an envelope material for high intensity alkali metal vapor lamps such as high pressure sodium vapor lamps, because it withstands the attack of the vapors of the alkali metals even at high temperatures. In making such lamps, metal end caps or closures must be hermetically bonded to a ceramic tube; the end caps support the electrodes within the tubes and provide electrical connections thereto. The metal having a coefficient of expansion closest to that of alumina ceramic is niobium and a sealing composition assuring a good bond between this metal and alumina ceramic is particularly desired.

In U.S. Pat. No. 3,281,309—Ross, compositions for sealing metal to alumina ceramic are disclosed consisting of aluminum oxide and calcium oxide as principal ingredients optionally with a minor proportion of magnesium oxide. Preferred compositions are some in which the constituent oxides are in eutectic or near eutectic proportions. Desirable properties of sealing compositions are favorable liquidus temperature, wide sealing temperature range, ability to form glasses when melted and cooled rapidly, and stability in the presence of alkali metal vapors at elevated temperatures. The liquidus temperature must of course be above the highest to be encountered during operation of the lamp, but preferably not much above such maximum in order to facilitate manufacture and assure longer furnace life. The sealing range refers to the maximum departure from optimum sealing temperature which can be tolerated and yet result in a good seal and it should be as wide as possible.

The object of the invention is to provide a seal of niobium end caps to alumina ceramic tubes for use in high intensity sodium vapor discharge lamps and which facilitates manufacture and makes possible a lower proportion of rejects. A sealing composition is desired which is improved in respect of the criteria stated above, and particularly with respect to sealing range.

SUMMARY OF THE INVENTION

In accordance with the present invention, we provide an alumina to metal seal utilizing a calcium aluminate glass sealing composition having improved chemical stability and which will withstand attack by alkali metal vapors including sodium at temperatures up to about 900° C. The composition can be used either for bonding other ceramics or refractory metal bodies to ceramics. It has a lower liquidus temperature and a wider sealing range than prior art glasses used for this purpose. The composition, which for the sake of brevity will be referred to as G–45 wherein the numeral 45 has reference to the weight percentage of $Al_2O_3$, is given below in both molar and weight percentages.

| | Molar, percent | Weight, percent |
|---|---|---|
| CaO | 50 | 36.4 |
| $Al_2O_3$ | 31 | 45.0 |
| MgO | 12 | 4.7 |
| BaO | 7 | 13.0 |

The benefits of the invention will still be realized, but to a reduced extend, with a departure of as much as ±5 percent from the figures given; a departure not exceeding ±1 percent is desirable and practical in lamp manufacture.

DESCRIPTION OF DRAWINGS

FIG. 1 shows an alumina ceramic lamp in which the sealing composition of the invention is used.

DESCRIPTION OF PREFERRED EMBODIMENT

A typical lamp application of the seal in accordance with the invention is illustrated in FIG. 1 wherein an arc tube 1 comprises an envelope 2 of ceramic tubing consisting of sintered high density polycrystalline alumina. A central portion of the tube has been cut out to shorten the FIG., and the internal construction can be seen in the sectioned lower portion. By way of example, in a 400 watt size of lamp, the arc tube is about 110 mm. long by 7.5 mm. in diameter.

The ends of the tube are closed by thimblelike niobium closures or end caps 3, 3' hermetically sealed to the ceramic by means of the sealing composition of the invention. The sealing composition is indicated at 4 and is located within the space between the expanded shoulder portion 5 of the end cap and side and end of the ceramic tube. A niobium tube 6 penetrates into the thimble and is used as an exhaust tube during manufacture after which it is closed off. A thermionic electrode 7 is mounted in each end of the arc tube and is supported through the niobium tube 6 from the end cap 3. A shield 8 mounted beyond the electrode prevents the arc from striking in the seal area. The filling of the arc tube may consist of a sodium-mercury amalgam dose and an inert gas such as xenon to facilitate starting. The arc tube is not operated in air but is mounted within an evacuated outer jacket (not shown) which prevents oxidation of the metal end caps.

The G–45 sealing composition or glass of the invention was subjected to a test program to evaluate it by comparison with other sealing compositions used in commercial production of high intensity sodium vapor lamps. One composition, designated G–54, is as follows:

CaO 38.5 percent (by weight)
$Al_2O_3$ 54.0 percent
MgO 7.5 percent

Another sealing composition designated G–48, which is described in detail and claimed in copending application Ser. No. 588,955 of James F. Sarver and William C. Louden, filed Oct. 24, 1966, entitled "Calcia Magnesia Alumina Seal Compositions" and similarly assigned, now U.S. Pat. No. 3,441,421 is as follows:

CaO 43.5 percent (by weight)
$Al_2O_3$ 48.0 percent
MgO 8.5 percent

Test seals were made using the three sealing compositions with alumina ceramic arc tubes and niobium end caps following the technique used in commercial production of Lucalox high intensity sodium discharge lamps by applicant's assignee. The niobium caps were precoated with sealing glass composition in the manner described in detail in copending application Ser. No. 590,568 of William C. Louden, filed Oct. 31, 1966, entitled "Niobium End Seal." Briefly the method consists in first mixing tungsten trioxide with a minor percentage by weight of sealing composition, coating said mixture on the sealing surface of the niobium cap, and sintering in vacuum above the melting temperature of the sealing composition. The tungsten coated surface of the niobium end cap is then completely coated over with a layer of sealing composition and again fired in vacuum to the same temperature. Finally an alumina ceramic tube is assembled with a pair of end caps previously treated as described. Alternatively, niobium end caps which have been coated with zirconium may be used. One process for zirconium coating is zirconiding wherein zirconium is electrodeposited in a molten fluoride bath. Reference may be made to copending application Ser. No. 825,086 filed Nov. 18, 1968 by Paul J. Jorgensen, entitled "Ceramic-Metal Bonding Composition and Composite Article of Manufacture" for a more complete description of such zirconium-coated end caps. At this point, a quantity of the sealing composition which preferably has previously been pressed into a sealing washer of appropriate size, is disposed between the ends of the alumina tube and the end caps. The whole assembly is fired in high vacuum to a temperature sufficient to melt the sealing composition, between 1400° C. and 1500° C., depending upon the composition used. The sealing composition spreads out between the mating surfaces of the alumina tube and the niobium end caps, filling the joint as indicated at 4, and upon cooling the parts are bonded together.

A number of lamps sufficient to overcome any statistical variation in the results were made up using the three different sealing compositions. The results are summarized below. The term "sealing range" refers to the range in sealing temperature over which satisfactorily strong seals can be made, such range being referenced to the nominal sealing temperature determined for the particular composition. The "liquidus" is the solidification temperature upon cooling.

| Composition | Sealing range, °C. | Liquidus, °C. |
| --- | --- | --- |
| G-45 (this invention) | ±50 | 1,410 |
| G-54 (Jorgensen) | ±15 | 1,483 |
| G-48 (Sarver & Louden) | ±25 | 1,487 |

The G-45 sealing composition of the invention has the lowest liquidus temperature and the broadest sealing range. Both are very important in practical lamp manufacturing. The parts of high intensity sodium vapor alumina ceramic lamps as sealed together in a high temperature electric vacuum furnace. The alumina tubes and niobium end caps are assembled vertically and loaded into the vacuum chamber in trays for processing in batches. The chamber must be evacuated at every operation prior to heating and the effective limitation on production is the handling capacity of the furnace. The furnace has a limited life which is lessened when the temperature is increased. The lower liquidus temperature of the G-45 sealing composition makes for a substantial increase in furnace life.

The greater sealing range of the G-45 composition means that the exact furnace temperature and temperature variations within the furnace are no longer so critical. There often occurs a vertical variation in temperature within the furnace chamber. The greater sealing range of the invention permits two-high stacking of tubes within the furnace, thereby doubling the number of lamps produced per batch. Alternatively, for a given degree of furnace temperature control (which is inevitably always less than perfect), the G-45 composition of the invention will substantially reduce the number of early lamp failures due to improper sealing temperature.

Comparison of the G-45 glass composition of the invention with compositions previously used such as the G-54 (Jorgensen) composition shows that the former evolves much less gaseous contamination in vacuum melting. This means that when the composition is used to seal the metal end caps to the alumina arc tube in the vacuum furnace, there is much less gaseous contamination of the interior of the arc tube resulting in improved lamp performance, increased light output, better maintenance and less lamp voltage rise during life. Accelerated life tests of lamps made using the G-45 sealing glass of the invention indicate a life at least equal to if not superior to that of lamps using prior sealing compositions.

What we claim as new and desire to secure by Letters Patent of the United States is:

We claim:

1. A sealed electric device comprising an envelope formed of an alumina ceramic tube with refractory metal end caps closing its ends, and a sealing composition bonding said end caps to said ceramic tube, said composition consisting of CaO 36.4 percent
$AO_2O_3$ 45.0 percent
MgO 4.7 percent
by
BaO 13.9 percent by weight with a maximum permissible departure from these proportions of ±5 percent.

2. A device as in claim 1 wherein the departure from the given proportions does not exceed ±1 percent.

3. A device as in claim 1 constituting an electric lamp and having electrodes within said envelope attached to said end caps and containing a filling of alkali metal.

4. An electric lamp as in claim 3 wherein the end caps are niobium.

5. An electric lamp as in claim 3 wherein the end caps are niobium coated with tungsten trioxide.

6. An electric lamp as in claim 3 wherein the end caps are niobium coated with zirconium.